(12) United States Patent  
Kawaguchi

(10) Patent No.: US 11,490,324 B2
(45) Date of Patent: Nov. 1, 2022

(54) BASE STATION APPARATUS, CONTROL METHOD, AND CONTROL PROGRAM FOR SWITCHING A CHANNEL ACCORDING TO A PRIORITY OF BEACONS

(71) Applicant: NEC Platforms, Ltd., Kawasaki (JP)

(72) Inventor: Naohisa Kawaguchi, Kawasaki (JP)

(73) Assignee: NEC Platforms, Ltd., Kanagawa (JP)

( * ) Notice: Subject to any disclaimer, the term of this patent is extended or adjusted under 35 U.S.C. 154(b) by 63 days.

(21) Appl. No.: 17/094,325

(22) Filed: Nov. 10, 2020

(65) Prior Publication Data

US 2021/0144631 A1 May 13, 2021

(30) Foreign Application Priority Data

Nov. 13, 2019 (JP) .............................. JP2019-205160

(51) Int. Cl.
| | | |
|---|---|---|
| *H04W 4/00* | (2018.01) | |
| *H04J 1/16* | (2006.01) | |
| *H04W 48/16* | (2009.01) | |
| *H04W 48/12* | (2009.01) | |
| *H04W 72/04* | (2009.01) | |
| *H04W 76/23* | (2018.01) | |
| *H04W 16/14* | (2009.01) | |

(52) U.S. Cl.
CPC ........... *H04W 48/16* (2013.01); *H04W 16/14* (2013.01); *H04W 48/12* (2013.01); *H04W 72/0453* (2013.01); *H04W 76/23* (2018.02)

(58) Field of Classification Search
CPC ..... H04W 48/16; H04W 76/23; H04W 16/14; H04W 48/12; H04W 72/0453

USPC ......................................................... 370/338
See application file for complete search history.

(56) References Cited

U.S. PATENT DOCUMENTS

| | | | | |
|---|---|---|---|---|
| 9,439,197 B1* | 9/2016 | Ngo | ...................... | H04W 16/14 |
| 2003/0107512 A1* | 6/2003 | McFarland | ............. | G01S 7/021 |
| | | | | 342/52 |
| 2004/0151137 A1* | 8/2004 | McFarland | ........... | H04W 72/02 |
| | | | | 370/341 |
| 2008/0020791 A1* | 1/2008 | Ito | ......................... | H04W 36/18 |
| | | | | 455/516 |
| 2009/0146866 A1* | 6/2009 | Matsumoto | ........... | H04W 16/14 |
| | | | | 342/52 |

(Continued)

FOREIGN PATENT DOCUMENTS

| | | |
|---|---|---|
| JP | 2007-214713 A | 8/2007 |
| JP | 2007-536865 A | 12/2007 |

(Continued)

OTHER PUBLICATIONS

Japanese Office Action for JP Application No. 2019-205160 dated Feb. 24, 2021 with English Translation.

(Continued)

*Primary Examiner* — Mark G. Pannell
(74) *Attorney, Agent, or Firm* — Sughrue Mion, PLLC

(57) ABSTRACT

A base station apparatus includes a first wireless communication unit configured to transmit a first beacon for performing wireless communication in a first channel, a second wireless communication unit configured to transmit a second beacon for performing wireless communication in a second channel, and a control unit configured to switch a channel in which the first beacon is transmitted to the second channel when a radar wave is detected in the first channel.

20 Claims, 5 Drawing Sheets

(56) References Cited

U.S. PATENT DOCUMENTS

| | | | | |
|---|---|---|---|---|
| 2010/0302966 A1* | 12/2010 | Matsuura | ............ | H04W 16/14 370/252 |
| 2012/0213086 A1* | 8/2012 | Matsuura | ............ | H04W 16/14 370/241 |
| 2016/0007247 A1* | 1/2016 | Lee | ................ | H04W 36/0072 370/331 |
| 2017/0063665 A1* | 3/2017 | Casebolt | ........... | H04W 74/0808 |
| 2021/0409961 A1* | 12/2021 | Changlani | ............... | G01S 7/021 |

FOREIGN PATENT DOCUMENTS

| | | | |
|---|---|---|---|
| JP | 2009-100210 | A | 5/2009 |
| JP | 2010-503286 | A | 1/2010 |
| JP | 2010-278825 | A | 12/2010 |
| JP | 2014-519295 | A | 8/2014 |
| JP | 2017-073675 | A | 4/2017 |
| JP | 2017-200156 | A | 11/2017 |
| WO | 2014/048801 | A1 | 4/2014 |

OTHER PUBLICATIONS

Japanese Office Action 2019-205160; dated Sep. 23, 2020, 8 pages.
"IEEE Standard for Information technology Telecommunications and information exchange between systems—Local and metropolitan area networks Specific requirements", IEEE 802.11h-2003; dated Oct. 14, 2003; 75 pages.
Japanese Office Communication for JP Application No. 2019-205160 dated Aug. 31, 2021 with English Translation.

* cited by examiner

BASE STATION APPARATUS, CONTROL METHOD, AND CONTROL PROGRAM FOR SWITCHING A CHANNEL ACCORDING TO A PRIORITY OF BEACONS

INCORPORATION BY REFERENCE

This application is based upon and claims the benefit of priority from Japanese patent application No. 2019-205160, filed on Nov. 13, 2019, the disclosure of which is incorporated herein in its entirety by reference.

TECHNICAL FIELD

The present disclosure relates to a base station apparatus, a control method, and a control program.

BACKGROUND ART

In recent years, in addition to frequencies in a 2.4 GHz band, those in a 5 GHz band can also be used in wireless LANs (Local Area Networks), so that it is possible to perform faster data communication therethrough. The specifications for communication in the wireless LAN are standardized by IEEE (Institute of Electrical and Electronics Engineers) 802.11. In the standardized specifications for the wireless LAN, there is IEEE 802.11h for regulations for spectrums and transmission outputs when a wireless LAN system using the 5 GHz band is operated in Europe, in which two functions, i.e., a function of TPC (Transmit Power Control) for regulations for transmission outputs and a function of DFS (Dynamic Frequency Selection) for regulations for spectrums, are defined (see, e.g., Non-Patent Literature 1).

As related art, for example, Patent Literatures 1 and 2 are known. Patent Literature 1 discloses that a state of a channel different from a channel in use is monitored in order to detect radar waves in the 5 GHz band. Patent Literature 2 mentions that results of detection of radar waves in the 5 GHz band are managed by using a radar detection channel management table.

CITATION LIST

Patent Literature 1: Japanese Unexamined Patent Application Publication No. 2010-278825
Patent Literature 2: Japanese Unexamined Patent Application Publication No. 2007-214713
Non-Patent Literature 1: IEEE 802.11h-2003, "5. General description" (p. 3-5)

SUMMARY

In the above-described related art, a channel to be used is dynamically selected based on detection of radar waves. However, in the related art, there is a problem that when the selected channel is used, a period during which communication cannot be performed (hereinafter also referred to as a communication unavailable period or a communication unavailable time) may occur.

In view of the above-described problem, an example object of the present disclosure is to provide a base station apparatus, a control method, and a control program capable of preventing a communication unavailable period from occurring.

In a first example aspect, a base station apparatus includes: a first wireless communication unit configured to transmit a first beacon for performing wireless communication in a first channel; a second wireless communication unit configured to transmit a second beacon for performing wireless communication in a second channel; and a control unit configured to switch a channel in which the first beacon is transmitted to the second channel when a radar wave is detected in the first channel.

In another example aspect, the present disclosure provides a method for controlling the above-described base station apparatus.

In another example aspect, the present disclosure provides a control program for causing a computer to function as the above-described base station apparatus.

According to the present disclosure, it is possible to provide a base station apparatus, a control method, and a control program capable of preventing a communication unavailable period from occurring.

BRIEF DESCRIPTION OF DRAWINGS

The above and other aspects, features and advantages of the present disclosure will become more apparent from the following description of certain example embodiments when taken in conjunction with the accompanying drawings, in which.

EMBODIMENTS (Study Leading to Example Embodiment)

In Japan, for example, since a part of the 5 GHz band has been already allocated to weather radars and other various radars, radio waves in the 5 GHz band used in the wireless LAN interfere with radar waves of such radars. Therefore, it is obligatory to provide a wireless access point using the 5 GHz band with a DFS function and/or a TPC function including a radar-wave detection function.

In the case of the DFS, the wireless access point must perform a radar search for 60 seconds before using a channel in the 5 GHz-band when it is unclear whether or not any radar is already using that channel. Further, if radar waves are detected when the wireless access point is using a channel in the 5 GHz-band, it must stop using that channel and refrain from using that channel for 30 minutes.

Therefore, when a wireless access point in the related art selects a new channel after stopping radio transmission upon detection of radar waves, it performs a radar search for at least 60 seconds. During this period, the wireless access point cannot perform wireless communication, and hence any wireless terminal connected to this wireless access point cannot perform communication. Therefore, in the related art, there is a problem that in the case where a channel in the 5

GHz band is used, when radar waves are detected, a period of at least 60 seconds during which communication cannot be performed occurs.

In order to avoid this problem, for example, the following functions are known: a function of continuously searching for a channel and detecting an available channel by using another antenna; and a function of sharing information about used channels among a plurality of wireless access points and thereby selecting a channel that does not interfere with those of radars (e.g., Patent Literatures 1 and 2). However, even in these related techniques, it is difficult to further shorten the time during which communication cannot be performed.

(Overview of Example Embodiment)

Figure 1:
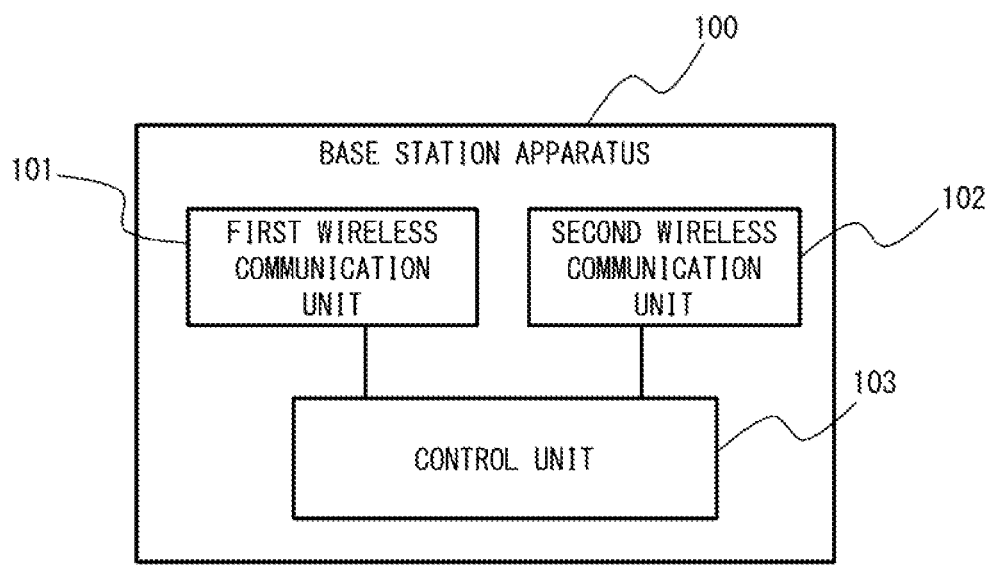
FIG. 1 shows a configuration of an outline of a base station apparatus according to an example embodiment.

FIG. 1 shows an outline of a base station apparatus (a wireless access point) according to an example embodiment. As shown in FIG. 1, the base station apparatus 100 according to the example embodiment includes a first wireless communication unit 101, a second wireless communication unit 102, and a control unit 103.

The first wireless communication unit 101 transmits a first beacon for performing wireless communication in a first frequency channel, and the second wireless communication unit 102 transmits a second beacon for performing wireless communication in a second frequency channel. When radar waves are detected in the first frequency channel, the control unit 103 switches the channel in which the first beacon is transmitted to the second frequency channel. The second frequency channel is a channel in which no radar wave is detected.

In the base station apparatus that performs communication by using the first and second frequency channels, it is possible, when radar waves are detected, to prevent a communication unavailable period from occurring by switching the channel in which the beacon is transmitted as described above.

First Example Embodiment

Figure 2:
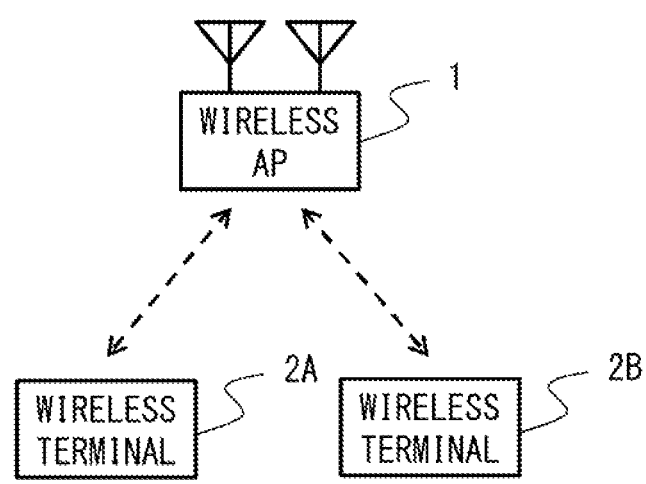
FIG. 2 shows a configuration of a wireless LAN system according to a first example embodiment.

A first example embodiment will be described hereinafter with reference to the drawings. FIG. 2 shows a configuration of a wireless LAN system according to this example embodiment, and FIG. 3 shows a configuration of a wireless access point (a wireless AP) according to this example embodiment.

As shown in FIG. 2, a wireless LAN system (a wireless communication system) according to this example embodiment includes a wireless AP 1 and wireless terminals 2 (e.g., wireless terminals 2A and 2B). Each of the wireless AP 1 and the wireless terminals 2 is a wireless communication apparatus that performs wireless LAN communication specified by the IEEE 802.11, and performs wireless communication by using a 5 GHz band in this example. The 5 GHz band is a frequency band where a DFS is obligatory. The 5 GHz band includes a plurality of frequency bands such as a W53 GHz band (5,250 to 5,350 MHz) and a W56 GHz band (5,470 to 5,725 MHz). Radio signals in the W53 GHz band do not interfere with those in the W56 GHz band because their respective frequencies are sufficiently apart (i.e., separated) from each other. Therefore, the wireless AP 1 can simultaneously perform wireless communication with the wireless terminals 2 by using a channel in the W53 GHz band and a channel in the W56 GHz band. For example, the wireless AP 1 can communicate with the wireless terminal 2A using a channel in the W53 GHz band and communicate with the wireless terminal 2B using a channel in the W56 GHz band at the same time. The wireless AP 1 may use two channels for communication with one wireless terminal 2 (the wireless terminal 2A or 2B).

The wireless AP 1 is an access point that can simultaneously perform wireless communication with the wireless terminals 2 by using a plurality of channels in the 5 GHz band, and has a DFS function specified by the IEEE 802.11h. In this example embodiment, the wireless AP 1 has a function of, when it detects radar waves in a channel in use by the DFS function, stopping transmission in the channel in which the radar waves are detected and making the wireless terminal 2 connected thereto in that channel transfer to (i.e., use) the other channel in use.

Figure 3:
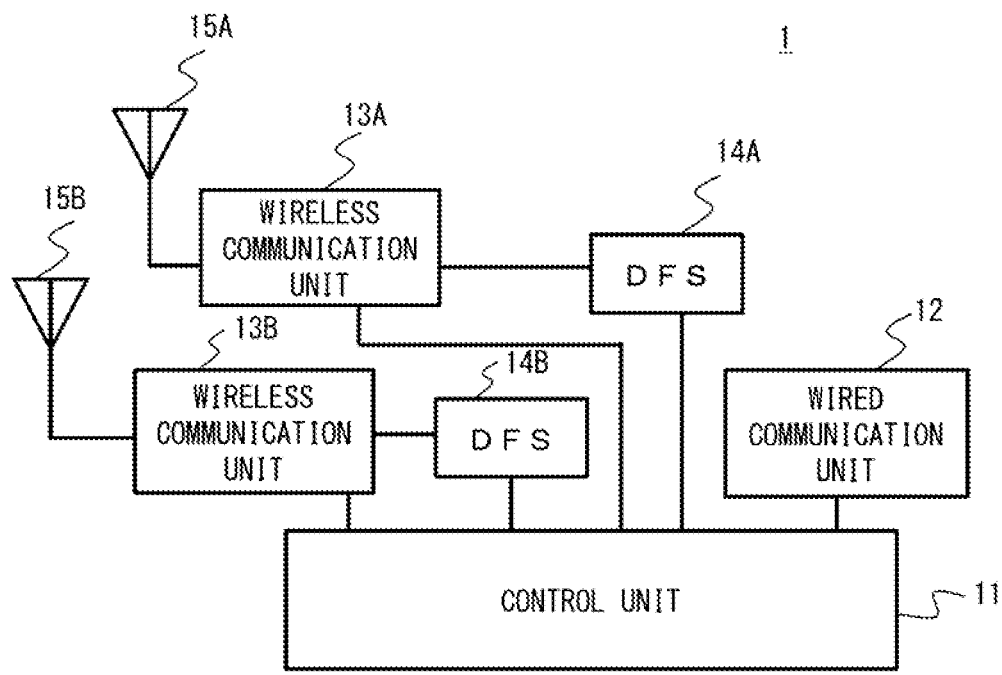
FIG. 3 shows a configuration of a wireless access point according to the first example embodiment.

As shown in FIG. 3, the wireless AP 1 includes a control unit 11, a wired communication unit 12, wireless communication units 13A and 13B, DFSs 14A and 14B, and antennas 15A and 15B.

The control unit 11 is a control unit that controls each unit (e.g., each component) of the wireless AP 1, and controls operations performed by the wired communication unit 12, the wireless communication units 13A and 13B, and the DFSs 14A and 14B. For example, the control unit 11 controls channels and the like used by the wireless communication units 13A and 13B. Further, the control unit 11 controls relaying of communication between the wired communication unit 12 and the wireless communication units 13A and 13B.

The wired communication unit 12 is a communication unit that performs communication through a wired LAN or the like. For example, the wired communication unit 12 communicates with a WAN (Wide Area Network) through a wired LAN or the like.

The wireless communication units 13A and 13B are communication units that perform communication in radio channels in different bands according to the specifications of the IEEE 802.11. The wireless communication units 13A and 13B can select channels to be used from those in the 5 GHz band. For example, the wireless communication unit 13A performs wireless communication by using a channel in the W53 GHz band, and the wireless communication unit 13B performs wireless communication by using a channel in the W56 GHz band. Note that the channels used by the wireless communication units 13A and 13B may be channels in other frequency bands as long as they do not interfere with each other. For example, they may use channels in the 2.4 GHz band, instead of or in addition to those in the 5 GHz band.

The DFSs 14A and 14B provide DFS functions through the wireless communication units 13A and 13B, respectively. The DFS 14A detects, through the wireless communication unit 13A, radar waves in a channel used by the wireless communication unit 13A, and the DFS 14B detects, through the wireless communication unit 13B, radar waves in a channel used by the wireless communication unit 13B. Each of the DFSs 14A and 14B monitors radar waves in a new channel for 60 seconds before the new channel is used. Further, each of the DFSs 14A and 14B monitors radar waves in the channel in use and notifies the control unit 11 of a result of the monitoring (the detection).

The antennas 15A and 15B transmit and receive radio signals of the wireless communication units 13A and 13B, respectively. The antenna 15A is connected to the wireless communication unit 13A and transmits/receives radio signals in the channel used by the wireless communication unit 13A, and the antenna 15B is connected to the wireless communication unit 13B and transmits/receives radio signals in the channel used by the wireless communication unit 13B.

Figure 4:
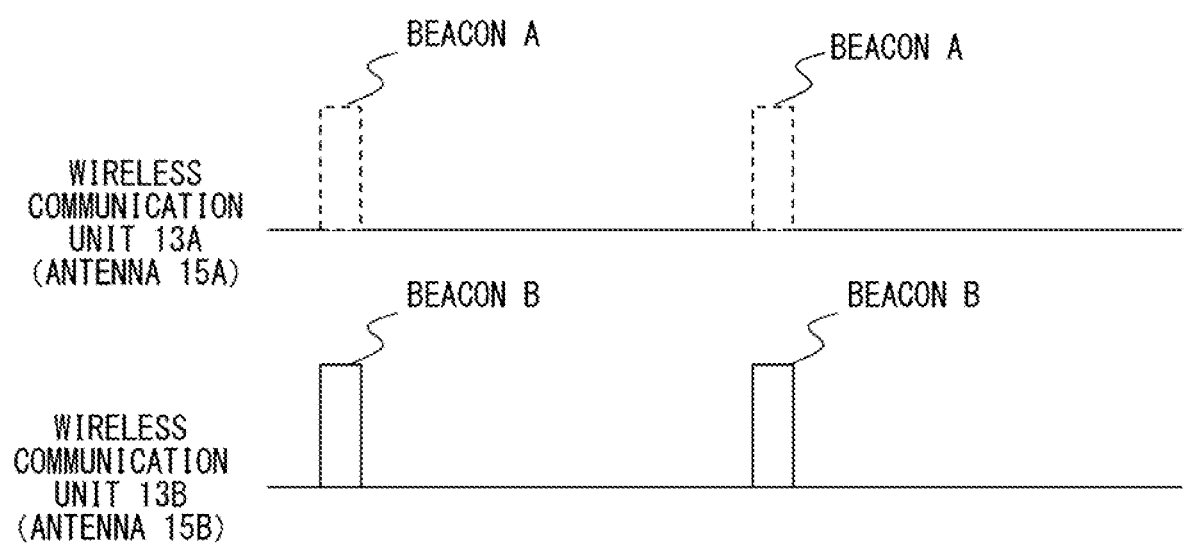
FIG. 4 shows an example of transmission of a beacon according to the first example embodiment.

Next, an example of transmission of a beacon according to this example embodiment will be described. FIG. 4 shows an example of transmission of a beacon performed by the wireless AP 1 in a normal state, and FIG. 5 shows an example of transmission of a beacon performed by the wireless AP 1 when radar waves are detected.

As shown in FIG. 4, in the normal state, i.e., when no radar wave is detected, the wireless AP 1 transmits a beacon A from the wireless communication unit 13A through the antenna 15A, and transmits a beacon B from the wireless communication unit 13B through the antenna 15B. The wireless communication unit 13A periodically transmits, for example, the beacon A including an ESSID (Extended Service Set Identifier) (A) in a channel A in the W53 GHz band, and the wireless communication unit 13B periodically transmits, for example, the beacon B including an ESSID (B) in a channel B in the W56 GHz band. Since the channels A and B do not interfere with each other, the beacons A and B can be transmitted at the same timing as shown in this example.

It is assumed that, for example, the wireless terminal 2A connects to a network having the ESSID (A), and the wireless terminal 2B connects to a network having the ESSID (B). Then, since the ESSID (A) is included in the beacon A received in the channel A, the wireless terminal 2A wirelessly communicates with the wireless AP 1 in the channel A. Further, since the ESSID (B) is included in the beacon B received in the channel B, the wireless terminal 2B wirelessly communicates with the wireless AP 1 in the channel B.

Figure 5:
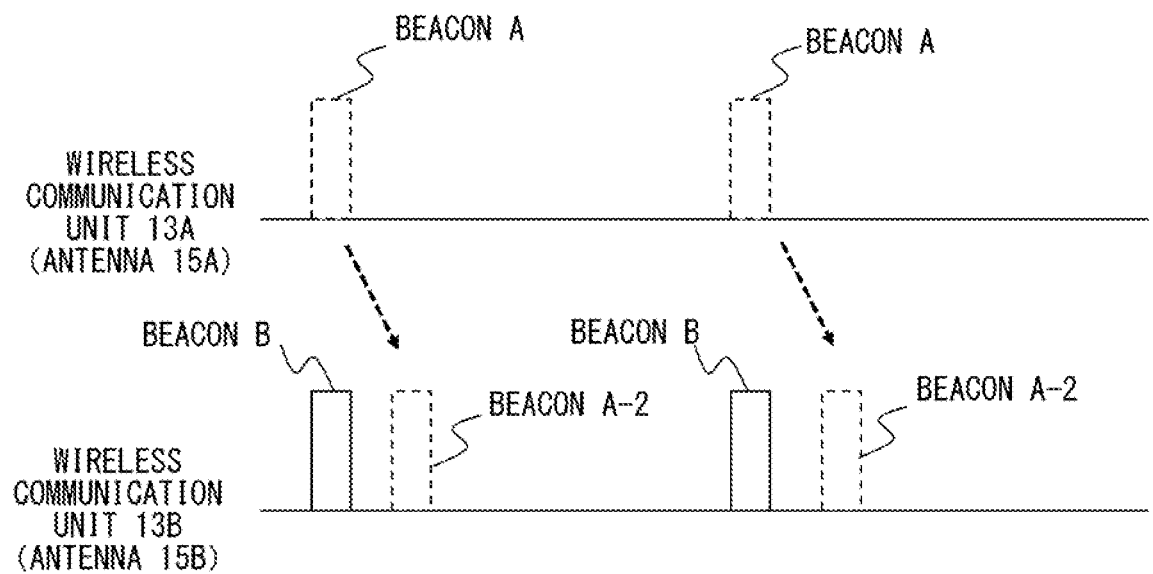
FIG. 5 shows an example of transmission of a beacon according to the first example embodiment.

As shown in FIG. 5, when radar waves are detected in the channel A of the wireless communication unit 13A, the wireless communication unit 13A stops the wireless communication in the channel A. Further, the beacon A, which has been transmitted from the wireless communication part 13A through the antenna 15A until then, is transmitted from the wireless communication part 13B through the antenna 15B. Note that the beacon A that has been transferred from the channel A to the channel B is indicated as a beacon A-2. Since the beacon B uses (i.e., is transmitted in) the same channel B as the beacon A-2, the beacon A-2 is transmitted at a timing different from that for the beacon B. The beacon A-2 uses the same ESSID (A) as that of the beacon A. Therefore, since the ESSID (A) is included in the beacon A received in the channel B, the wireless terminal 2A switches its channel to the channel B and wirelessly communicates with the wireless AP 1 in the channel B.

As described above, in the wireless AP 1 using the channel A in the W53 GHz band and the channel B in the W56 GHz band, it is possible to shorten, when radar waves are detected in the channel A, the communication unavailable time of the wireless terminal 2 that has used the channel A until then by guiding the wireless terminal 2, which has used the channel A until then, to the channel B. The wireless terminal 2 selects its channel based on information about the ESSID included in the beacon transmitted by the wireless AP 1. Therefore, it is possible, by transferring (i.e., changing) the channel in which this beacon is transmitted, to make the wireless terminal 2 follow and transfer to the new channel. Note that an operation in which a wireless terminal selects one wireless AP from a plurality of wireless APs having the same ESSID (i.e., in which a wireless terminal transfers to a new wireless AP) is referred to as "roaming".

Figure 6:
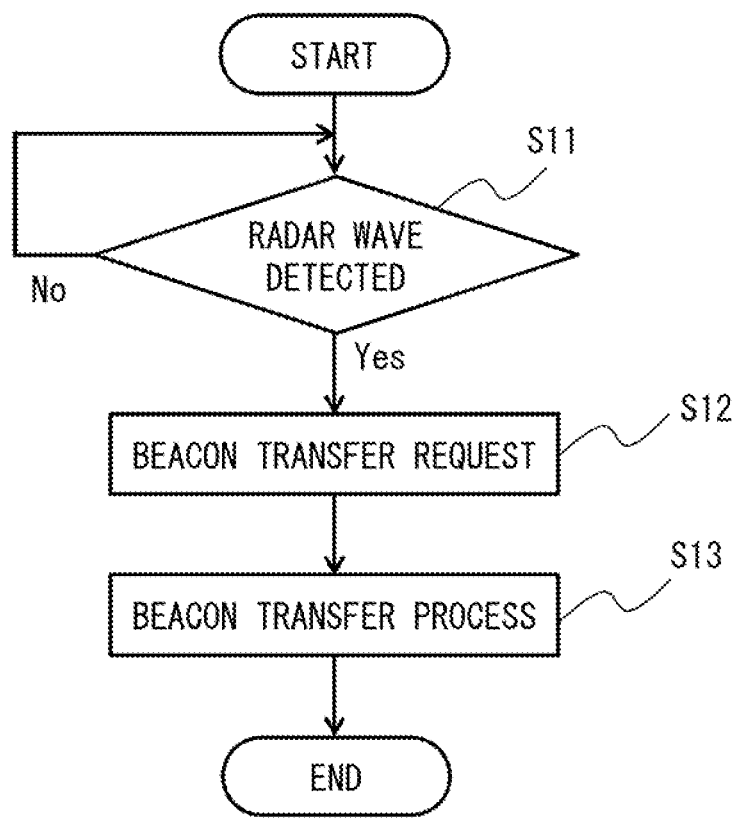
FIG. 6 is a flowchart showing operations performed by the wireless access point according to the first example embodiment.
Figure 7:
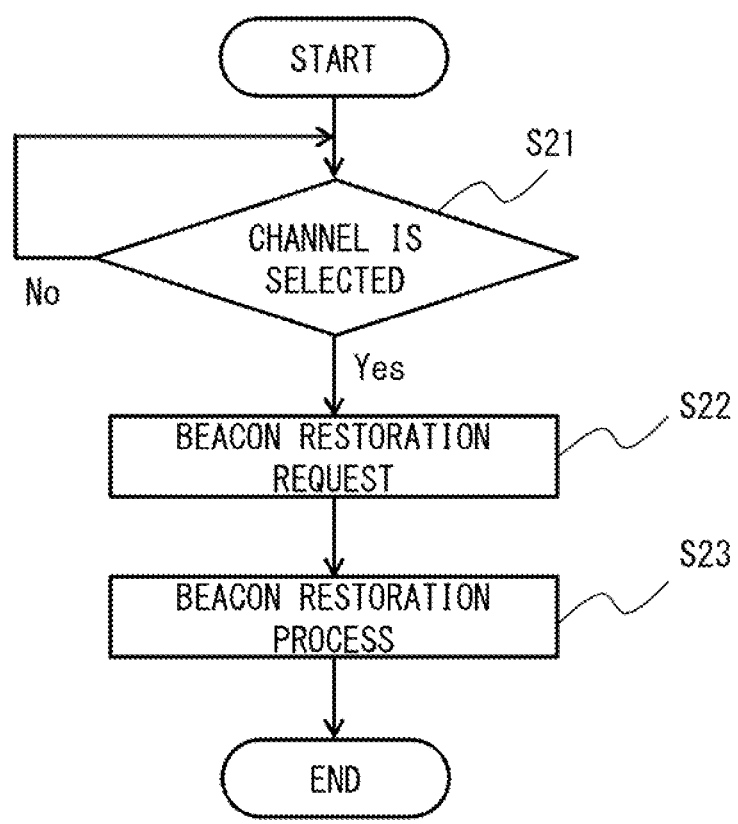
FIG. 7 is a flowchart showing operations performed by the wireless access point according to the first example embodiment.

Next, as example of operations performed by the wireless AP according to this example embodiment, operations for detecting radar waves and changing an antenna from which a beacon is transmitted (hereinafter also referred to as a transmission antenna of a beacon) will be described with reference to flowcharts shown in FIGS. 6 and 7. FIGS. 6 and 7 show operations for selecting a channel in which a beacon is transmitted (hereinafter also referred to as a transmission channel of a beacon) in the wireless AP 1 having the configuration shown in FIG. 3 according to this example embodiment. FIG. 6 shows operations for, when radar waves are detected in the channel in use, concentrating a plurality of channels in use into one channel. Further, FIG. 7 shows operations for, when a new channel that has not been used until then is selected, restoring the state to a state in which two channels are used. Through the operations shown in FIGS. 6 and 7, it is possible to change the channel in which the beacon is transmitted when radar waves are detected as shown in FIGS. 4 and 5.

Firstly, in FIG. 6, it is assumed that the wireless communication unit 13A selected the channel A (a first channel) and is performing communication in the selected channel A. The DFS 14A is performing an operation for detecting radar waves in the channel A, which is used in the wireless communication unit 13A (step S11). At this point, when the DFS 14A detects radar waves (Yes at step S11), the DFS 14A sends a beacon transfer request to the control unit 11 (step S12). When the DFS 14A does not detect radar waves (No at step S11), the DFS 14A continues the radar-wave detecting operation.

In the step S12, upon receiving the beacon transfer request, the control unit 11 performs a beacon transfer process (step S13). The beacon transfer process is a process for transferring (i.e., switching) the channel in which the beacon is transmitted (the channel of one of the wireless communication units) to the other channel (the channel of the other wireless communication unit). It can also be considered that the beacon transfer process is a process for transferring (i.e., changing) the transmission channel of the beacon when the two channels are currently used for wireless communication. For example, in the beacon transfer process, the beacon A, which is transmitted from the wireless communication unit 13A by using the channel A, is stopped, and a beacon A-2 is transmitted from the wireless communication unit 13B by using the channel B (a second channel). Note that the channel B is one of the channels which the wireless communication unit 13B can use and in which no radar wave is detected.

The beacons A and A-2 are beacons which have the same ESSID but whose transmission channels are different. When the wireless terminal 2 connected to the wireless communication unit 13A does not receive the beacon A transmitted in the channel A any longer and finds the beacon A-2 transmitted in the channel B, it operates in a manner similar to that in a normal roaming operation, and hence connects to the wireless communication unit 13B and resumes the communication. The wireless terminal 2 can perform wireless communication by using the other channel without waiting until the DFS 14A selects a new channel and resumes the wireless communication, and hence can shorten the wireless communication unavailable time.

Next, in FIG. 7, the DFS 14A selects a new channel (step S21). The DFS 14A performs monitoring for 60 seconds as specified in the IEEE 802.11h, and searches for a channel which does not interfere with radar waves. When the DFS 14A completes the search for a new channel in which radar waves are not detected (Yes at step S21), the DFS 14A transmits a beacon restoration request to the control unit 11 (step S22). The DFS 14A continues (i.e., repeats) the channel selecting process until it selects a new channel (No at step S21).

In the step S22, upon receiving the beacon restoration request, the control unit 11 performs a beacon restoring process (step S23). The beacon restoring process is a process for returning (i.e., switching) the channel in which the beacon is transmitted from the destination channel (i.e., the new channel) (i.e., the channel of the other wireless communication unit) to the original channel (the channel of the one of the wireless communication units). It can also be considered that the beacon restoring process is a process for, when only one of the two channels is currently used for wireless communication, transferring the transmission channel of the beacon from the channel that is currently used for the communication to a channel that is not currently used for the communication. For example, in the beacon restoring process, the beacon A-2, which is transmitted from the wireless communication unit 13B by using the channel B, is stopped, and the beacon A is transmitted from the wireless communication unit 13A by using a channel C (a third channel). Note that the channel C is one of the channels which the wireless communication unit 13A can use and in which no radar wave is detected. That is, the new channel is not limited to the channel C. That is, when the channel A is available, the channel A may be used.

As described above, the beacon A-2 in the channel B and the beacon A in the channel C use the same ESSID. When the wireless terminal 2 connected to the wireless communication unit 13B does not receive the beacon A-2 transmitted in the channel B any longer and finds the beacon A transmitted in the channel C, it operates in a manner similar to that in the normal roaming operation, and hence connects to the wireless communication unit 13A and resumes the communication.

As described above, in this example embodiment, in the wireless AP using a radio band for which radar-wave detection needs to be performed by a DFS function, it is possible, by transferring a beacon that is currently transmitted in a channel that needs to be stopped at the time when the wireless communication is stopped due to the detection of radar waves to the other channel in use, to make the wireless terminal perform roaming and thereby to shorten the communication unavailable time of the wireless terminal.

That is, in this example embodiment, in the wireless AP that can simultaneously perform two communication operations by using two channels (i.e., that includes two wireless communication units), when the wireless AP is simultaneously performing two communication operations by using two channels and radar waves are detected in one of the channels (e.g., the channel A), the wireless AP sends a beacon for guiding the wireless terminal that is using that channel to the other channel which is used for communication and in which no radar wave is detected (e.g., the channel B), and thereby makes the wireless terminal perform roaming to the other channel which is used for communication and in which no radar wave is detected. Further, when the wireless AP is not simultaneously performing two communication operations by using two channels, it performs an operation for detecting radar waves in a receiver (a wireless communication unit) in the channel that is not currently used (e.g., the channel A). Then, when radar waves are detected in the channel in use (e.g., the channel B), the wireless AP transmits a beacon for guiding the wireless terminal that is performing the communication to the channel in which no radar wave is detected (e.g., the channel A), and thereby makes the wireless terminal perform roaming to the channel in which no radar wave is detected. In this way, in the 5 GHz band wireless LAN system, it is possible, even when radar waves are detected, prevent a communication unavailable period from occurring.

Other Example Embodiments

In the above-described example embodiment, the communication unavailable time of the connected terminal is shortened by transferring the beacon in the channel in which radar waves are detected to the other channel. In this case, since the state is temporarily changed from the state in which two channels are used to the state in which only one channel is used, it is expected that the number of connected terminals in the channel increases and congestion may occur in the channel. Therefore, a priority may be set to each beacon in advance, so that a beacon having a higher priority may be preferentially transmitted.

For example, the control unit of the wireless AP transfers (switches) the channel of the beacon A, which is using the channel A, or the channel of the beacon B, which is using the channel B, according to the priorities of the beacons A and B. When the priority of the beacon A is higher than that of the beacon B, the transmission channel of the beacon A is transferred from the channel A to the channel B. When the priority of the beacon A is lower than the priority of the beacon B, the transmission channel of the beacon A is transferred from the channel A to the channel B only when a predetermined condition for the transfer is satisfied.

For example, a high-priority beacon(s) (priority beacon (s)) and a low-priority beacon(s) (non-priority beacon(s)) are prepared. It is possible, by setting a condition for permitting the transfer of the channel of the low-priority beacon, to reduce the influence on a wireless terminal(s) using the high-priority beacon. The transfer of the low-priority beacon is accepted only when the channel on the high-priority beacon side has a sufficient room (e.g., a sufficient available capacity). Examples of the condition for permitting the transfer of the low-priority beacon include a condition that the number of terminals connected to the high-priority beacon is not greater than a set number (a condition 1) and a condition that the total volume of communication of terminals connected to the high-priority beacon is not greater than a set percentage (a set %) of a radio use available speed (a condition 2).

Note that the present disclosure is not limited to the above-described example embodiments, and they may be modified as appropriate without departing from the scope and spirit of the disclosure. For example, the applications of the above-described example embodiments are not limited to the wireless LANs, and they may be applied to other wireless communication systems such as Bluetooth (Registered Trademark).

Each configuration in the above-described example embodiments may be constructed by software, hardware, or both of them. Further, each configuration may be constructed by one hardware device or one software program, or a plurality of hardware devices or a plurality of software programs. The function (the process) of each apparatus may be implemented by a computer having a CPU (Central Processing Unit), a memory, and the like. For example, a program for performing a method (a method for controlling a wireless AP) according to an example embodiment may be stored in a storage device, and each function may be implemented by having the CPU execute the program stored in the storage device.

The program can be stored and provided to a computer using any type of non-transitory computer readable media.

Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

REFERENCE SIGNS LIST

1 WIRELESS AP (ACCESS POINT)
2,2A,2B WIRELESS TERMINAL
11 CONTROL UNIT
12 WIRED COMMUNICATION UNIT
13, 13A, 13B WIRELESS COMMUNICATION UNIT
14, 14A, 14B DFS
15, 15A, 15B ANTENNA
100 BASE STATION APPARATUS
101 FIRST WIRELESS COMMUNICATION UNIT
102 SECOND WIRELESS COMMUNICATION UNIT
103 CONTROL UNIT

What is claimed is:

1. A base station apparatus comprising:
a memory configured for storing program instructions;
a processor configured to execute the program instructions, that when executing the instructions comprises:
a first wireless communication unit configured to transmit a first beacon for performing wireless communication in a first channel;
a second wireless communication unit configured to transmit a second beacon for performing wireless communication in a second channel; and
a control unit configured to switch a channel in which the first beacon is transmitted to the second channel when a radar wave is detected in the first channel,
wherein the control unit switches the channel according to an order of priority of the first and second beacons.

2. The base station apparatus according to claim 1, wherein the second channel is a channel in which no radar wave is detected.

3. The base station apparatus according to claim 2, wherein after the channel is switched, the control unit switches the channel in which the first beacon is transmitted to a third channel where no radar wave is detected.

4. The base station apparatus according to claim 3, further comprising a detection unit configured to detect a radar wave in the first and second channels.

5. The base station apparatus according to claim 3, wherein the control unit switches the channel in which the first beacon is transmitted when the order of priority of the first beacon is higher than that of the second beacon.

6. The base station apparatus according to claim 2, wherein the control unit switches the channel in which the first beacon is transmitted when the order of priority of the first beacon is higher than that of the second beacon.

7. The base station apparatus according to claim 6, wherein the control unit switches the channel in which the first beacon is transmitted when the order of priority of the first beacon is lower than that of the second beacon and a predetermined condition for a transfer is satisfied.

8. The base station apparatus according to claim 2, wherein the control unit switches the channel in which the first beacon is transmitted when the order of priority of the first beacon is lower than that of the second beacon and a predetermined condition for a transfer is satisfied.

9. The base station apparatus according to claim 2, further comprising a detection unit configured to detect a radar wave in the first and second channels.

10. The base station apparatus according to claim 9, wherein the detection unit detects the radar wave as a DFS (Dynamic Frequency Selection) function.

11. The base station apparatus according to claim 1, wherein after the channel is switched, the control unit switches the channel in which the first beacon is transmitted to a third channel where no radar wave is detected.

12. The base station apparatus according to claim 11, further comprising a detection unit configured to detect a radar wave in the first and second channels.

13. The base station apparatus according to claim 11, wherein the control unit switches the channel in which the first beacon is transmitted when the order of priority of the first beacon is higher than that of the second beacon.

14. The base station apparatus according to claim 1, wherein the control unit switches the channel in which the first beacon is transmitted when the order of priority of the first beacon is higher than that of the second beacon.

15. The base station apparatus according to claim 14, wherein the control unit switches the channel in which the first beacon is transmitted when the order of priority of the first beacon is lower than that of the second beacon and a predetermined condition for a transfer is satisfied.

16. The base station apparatus according to claim 1, wherein the control unit switches the channel in which the first beacon is transmitted when the order of priority of the first beacon is lower than that of the second beacon and a predetermined condition for a transfer is satisfied.

17. The base station apparatus according to claim 1, further comprising a detection unit configured to detect a radar wave in the first and second channels.

18. The base station apparatus according to claim 17, wherein the detection unit detects the radar wave as a DFS (Dynamic Frequency Selection) function.

19. A method for controlling the base station apparatus according to claim 1.

20. A non-transitory computer readable medium storing a control program for causing a computer to function as the base station apparatus according to claim 1.

* * * * *